(12) United States Patent
Kim et al.

(10) Patent No.: US 12,546,496 B2
(45) Date of Patent: Feb. 10, 2026

(54) AIR CLEANER AND METHOD FOR CONTROLLING THE AIR CLEANER

(71) Applicant: Samsung Electronics Co., Ltd., Suwon-si (KR)

(72) Inventors: Doyoon Kim, Suwon-si (KR); Yongchan Kwon, Suwon-si (KR); Seokho Ju, Suwon-si (KR); Jongsoo Hong, Suwon-si (KR); Junhoe Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 18/312,165

(22) Filed: May 4, 2023

(65) Prior Publication Data
US 2023/0272932 A1    Aug. 31, 2023

Related U.S. Application Data

(63) Continuation of application No. PCT/KR2023/001588, filed on Feb. 3, 2023.

(30) Foreign Application Priority Data

Feb. 22, 2022    (KR) .................. 10-2022-0023163

(51) Int. Cl.
*B01D 46/16*    (2006.01)
*B01D 46/00*    (2022.01)
(Continued)

(52) U.S. Cl.
CPC .......... *F24F 11/39* (2018.01); *B01D 46/0043* (2013.01); *B01D 46/0049* (2013.01);
(Continued)

(58) Field of Classification Search
CPC .. F24F 11/39; F24F 8/108; F24F 11/52; F24F 11/89; F24F 2110/64; F24F 13/28;
(Continued)

(56) References Cited

U.S. PATENT DOCUMENTS 5,507,847 A * 4/1996 George .................. B32B 27/38
                                                          55/497
6,167,107 A * 12/2000 Bates ..................... G01N 15/02
                                                          377/10
(Continued)

FOREIGN PATENT DOCUMENTS

JP    2012-166182 A    9/2012
KR    20-0329621 Y1    10/2003
(Continued)

OTHER PUBLICATIONS

Types of Manual Valves [retrieved on Sep. 27, 2021], https://www.tlv.com/global/KR/steam-theory/types-of-valves.html.
(Continued)

*Primary Examiner* — Dung H Bui
(74) *Attorney, Agent, or Firm* — Jefferson IP Law, LLP

(57) ABSTRACT

An air cleaner is provided. The air cleaner includes a main body, a case coupled to an outer side of the main body and comprising a suction port for sucking air into the main body, a filter unit disposed inside the main body, a dust sensor for sensing dust concentration, a first flow path provided so that air sucked through the suction port is flown to the side of the dust sensor, and a second flow path provided so that air filtered through the filter unit is flown to the side of the dust sensor, and the dust sensor may sense first dust concentration of air provided through the first flow path and sense second dust concentration of air provided through the second flow path.

13 Claims, 12 Drawing Sheets

(51) Int. Cl.
*B01D 46/42* (2006.01)
*B01D 46/44* (2006.01)
*B01D 46/46* (2006.01)
*F24F 8/108* (2021.01)
*F24F 11/39* (2018.01)
*F24F 11/52* (2018.01)
*F24F 11/89* (2018.01)
*F24F 110/64* (2018.01)

(52) U.S. Cl.
CPC ......... *B01D 46/0086* (2013.01); *B01D 46/16* (2013.01); *B01D 46/4272* (2013.01); *B01D 46/442* (2013.01); *B01D 46/46* (2013.01); *F24F 8/108* (2021.01); *F24F 11/52* (2018.01); *F24F 11/89* (2018.01); *B01D 2273/30* (2013.01); *F24F 2110/64* (2018.01)

(58) Field of Classification Search
CPC ........... B01D 46/0043; B01D 46/0049; B01D 46/0086; B01D 46/16; B01D 46/4272; B01D 46/442; B01D 46/46; B01D 2273/30; B01D 46/10; G01N 15/06; G01N 1/2205; G01N 15/075; G01N 2001/245; G01N 11/00
See application file for complete search history.

(56) References Cited

U.S. PATENT DOCUMENTS

| | | | | |
|---|---|---|---|---|
| 6,168,646 | B1* | 1/2001 | Craig | B01D 46/444 |
| | | | | 96/429 |
| 9,702,577 | B1* | 7/2017 | Lachapelle | F24F 11/77 |
| 10,695,706 | B2 | 6/2020 | Cho et al. | |
| 11,112,343 | B2 | 9/2021 | Lee et al. | |
| 11,371,742 | B2 | 6/2022 | Chu et al. | |
| 11,614,251 | B2* | 3/2023 | Kwon | F24F 11/72 |
| | | | | 700/276 |
| 11,708,986 | B1* | 7/2023 | Chan | F24F 11/39 |
| | | | | 454/229 |
| 2007/0012181 | A1* | 1/2007 | Niezgoda | B01D 46/0086 |
| | | | | 95/1 |
| 2012/0125592 | A1* | 5/2012 | Fadell | G05D 23/1917 |
| | | | | 96/417 |
| 2012/0323375 | A1* | 12/2012 | Dean-Hendricks | F24F 11/39 |
| | | | | 700/276 |
| 2016/0074801 | A1* | 3/2016 | Francis | B01D 46/46 |
| | | | | 55/482 |
| 2016/0223220 | A1* | 8/2016 | Berg | H01L 21/67173 |
| 2018/0353891 | A1 | 12/2018 | Cho et al. | |
| 2019/0001250 | A1* | 1/2019 | Moredock | B01D 46/446 |
| 2019/0299154 | A1* | 10/2019 | Meirav | B01D 53/0462 |
| 2019/0391061 | A1 | 12/2019 | Lee et al. | |
| 2020/0232898 | A1* | 7/2020 | Wu | G01N 15/0806 |
| 2020/0256578 | A1* | 8/2020 | Meis | B01D 46/446 |
| 2020/0318585 | A1* | 10/2020 | Herman | F02M 35/024 |
| 2020/0326090 | A1 | 10/2020 | Chu et al. | |
| 2021/0063038 | A1* | 3/2021 | Song | G05B 15/02 |
| 2021/0254853 | A1* | 8/2021 | Choi | F24F 8/10 |
| 2021/0310671 | A1* | 10/2021 | Won | F24F 11/523 |
| 2021/0379520 | A1* | 12/2021 | Prigge | F24F 8/10 |
| 2022/0016560 | A1* | 1/2022 | Hadding Delin | F24F 13/28 |
| 2022/0026334 | A1* | 1/2022 | Tamraz | G16H 15/00 |
| 2022/0184541 | A1* | 6/2022 | Edberg | B01D 53/261 |
| 2022/0203288 | A1* | 6/2022 | Wenger | B01D 46/0028 |
| 2022/0290886 | A1* | 9/2022 | Frenk | B01D 46/446 |
| 2022/0297170 | A1* | 9/2022 | Tsao | H01L 21/67727 |
| 2022/0390135 | A1* | 12/2022 | Saravanan | F24F 1/0358 |
| 2023/0001039 | A1* | 1/2023 | Liu | B01D 39/1607 |
| 2023/0263351 | A1* | 8/2023 | Ohlendorf | A47L 9/122 |
| | | | | 134/21 |
| 2023/0272932 | A1* | 8/2023 | Kim | B01D 46/10 |
| | | | | 96/405 |
| 2023/0296273 | A1* | 9/2023 | Han | F25B 41/42 |
| 2023/0398482 | A1* | 12/2023 | Goergen | B01D 46/009 |
| 2024/0009610 | A1* | 1/2024 | Scaife | B01D 46/682 |
| 2024/0367085 | A1* | 11/2024 | Vutla | A62B 23/00 |
| 2024/0418620 | A1* | 12/2024 | Eklund | G01N 15/075 |

FOREIGN PATENT DOCUMENTS

| | | |
|---|---|---|
| KR | 10-2016-0116264 A | 10/2016 |
| KR | 10-2018-0062628 A | 6/2018 |
| KR | 10-1962013 B1 | 3/2019 |
| KR | 10-2019-0071325 A | 6/2019 |
| KR | 10-2019-0078278 A | 7/2019 |
| KR | 10-2124456 B1 | 6/2020 |
| KR | 10-2230760 B1 | 3/2021 |
| WO | 2015/171571 A2 | 11/2015 |
| WO | 2018/224332 A1 | 12/2018 |
| WO | 2023/027332 A1 | 3/2023 |

OTHER PUBLICATIONS

International Search Report dated May 22, 2023, issued in an International Application No. PCT/KR2023/001588.

* cited by examiner

FIG. 6A

| DIFFERENCE OF DUST CONCENTRATION | REMAINING LIFESPAN OF FILTER |
|---|---|
| 100% ~ 90% | 1 YEAR |
| 90% ~ 80% | 6 MONTHS |
| 80% ~ 70% | 3 MONTHS |
| 70% ~ 60% | 1 MONTH |
| 60% ~ 50% | 10 DAYS |

# AIR CLEANER AND METHOD FOR CONTROLLING THE AIR CLEANER

CROSS-REFERENCE TO RELATED APPLICATION(S)

This application is a continuation application, claiming priority under § 365(c), of an International application No. PCT/KR2023/001588, filed on Feb. 3, 2023, which is based on and claims the benefit of a Korean patent application number 10-2022-0023163, filed on Feb. 22, 2022, in the Korean Intellectual Property Office, the disclosure of which is incorporated by reference herein in its entirety.

TECHNICAL FIELD

This disclosure relates to an air cleaner and a method for controlling the same. More particularly, the disclosure relates to an air cleaner for cleaning air and a method for controlling thereof.

BACKGROUND ART

As a result of research and the like that recent fine dust may be fatal to the human body is announced, consumers using an air cleaner are increasing. An air cleaner is a device for purifying air by removing dust in the air. The air cleaner may include a filter for removing dust or the like.

The air cleaner may remove dust contained in the air by the principle in which the dust in the air passing through the filter is filtered by the filter. In this example, as the air cleaner is driven, dust is accumulated in the filter of the air cleaner, which may cause degradation of the performance of the air cleaner.

Therefore, there is inconvenience that a user needs to clean or replace a filter and check a filter state with naked eyes to grasp when the cleaning or replacement timing is.

Recently, an air cleaner that estimates a state of a filter based on a driving time of an air cleaner and guides replacement and washing time of a filter has been introduced to a user. However, since the degree of contamination of the air is different according to the environment in which the filter is used, a method of simply using only the driving time may not accurately estimate the state of the filter.

In another way, there is a way to estimate a filter state using a flow sensor. Such this method has a higher accuracy than a method of using a driving time, but there is a problem in that a manufacturing cost of an air cleaner is increased in that a separate flow sensor is required.

The above information is provided as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an air cleaner for cleaning air and a method for controlling thereof.

Additional aspects will be set forth in part in the description which follows and, in part, will be apparent from the description, or may be learned by practice of the presented embodiments.

The present disclosure is devised to resolve the above-identified problem, and relates to an air cleaner capable of providing a user with information related to a state of a filter based on a difference in dust concentration of air before and after being filtered and a controlling method thereof.

In accordance with an aspect of the disclosure, an air cleaner is provided. The air cleaner includes a main body, a case coupled to an outer side of the main body and comprising a suction port for sucking air into the main body, a filter unit disposed inside the main body, a dust sensor for sensing dust concentration, a first flow path provided so that air sucked through the suction port is flown to the dust sensor, and a second flow path provided so that air filtered through the filter unit is flown to the dust sensor, and the dust sensor may sense first dust concentration of air provided through the first flow path and sense second dust concentration of air provided through the second flow path.

The dust sensor may be located between the first flow path and the second flow path.

A front end of the first flow path in which the air sucked through the suction port is flown to the first flow path may be located at a front surface of the filter unit to which the air sucked through the suction port is provided, and a front end of the second flow path in which air filtered by the filter unit is flown to the second flow path may be located on a rear surface of the filter unit from which the filtered air is discharged.

The air cleaner further includes a third flow path provided so as to make air provided to the dust sensor through the first flow path and the second flow path flow to the outside of the dust sensor.

The rear end of the third flow path from which the air is discharged may be located on a rear surface of the filter unit from which the filtered air is discharged from the filter unit.

The filter unit includes a filter member for filtering air sucked through the suction port, and a filter frame for forming a space in which the filter member is mounted.

The dust sensor may be disposed on an upper side of the filter frame.

The air cleaner further includes a display, a fan for sucking the air through the suction port and discharging the filtered air through the outlet of the air cleaner, and a processor configured to, based on the first dust concentration and the second dust concentration being sensed through the dust sensor, identify difference between the first dust concentration and the second dust concentration, and control the display to display information related to a state of the filter based on the identified difference.

The air cleaner further includes a first valve located on the first flow path for opening and closing the first flow path, and a second valve located on the second flow path for opening and closing the second flow path.

The processor may, based on receiving a user command to drive the air cleaner, provide air sucked through the suction port to the dust sensor by turning on the first valve and turning off the second valve, and based on the first dust concentration being sensed by the dust sensor, provide air filtered by the filter unit to the dust sensor by turning off the first valve and turning on the second valve.

The processor may, based on a preset time being elapsed after the user command is received, turn on the first valve and turn off the second valve.

The processor may maintain a driving speed of the fan constantly while the first dust concentration and the second dust concentration are being sensed.

The processor may, based on the identified difference being identified to be less than a preset value, control the display to display a user interface for guiding replacement of the filter.

The processor may, based on the identified difference being greater than or equal to a preset value, control the display to display information about remaining lifespan of the filter based on the identified difference.

The processor may control the display to display information about the second dust concentration.

In accordance with an aspect of the disclosure, a method of controlling an air cleaner is provided. The method includes sucking air through a suction port, making the air sucked through the first flow path flow to the dust sensor, making air filtered by the filter unit flow to the dust sensor through the second flow path, and discharging the filtered air through the outlet, wherein the dust sensor may sense first dust concentration of air provided through the first flow path and sense second dust concentration of air provided through the second flow path.

The dust sensor may be located between the first flow path and the second flow path.

A front end of the first flow path in which the air sucked through the suction port is flown to the first flow path may be located at a front surface of the filter unit to which the air sucked through the suction port is provided, and a front end of the second flow path in which air filtered by the filter unit is flown to the second flow path may be located on a rear surface of the filter unit from which the filtered air is discharged.

The control method further includes making air provided to the dust sensor through the third flow path to the outside of the dust sensor.

The rear end of the third flow path from which the air is discharged may be located on a rear surface of the filter unit from which the filtered air is discharged from the filter unit.

Effect of Invention

According to various embodiments of the disclosure, it is possible to provide information related to the state of the filter to the user based on the difference between the dust concentration of the air before being filtered and the dust concentration of the filtered air, and thus may provide information about the replacement time of the filter more accurately than the method of providing an alarm by estimating the state of the filter based on the driving time of the air cleaner.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 6A and 6B are diagrams illustrating displaying information related to a state of a filter by an air cleaner according to various embodiments of the disclosure;

Throughout the drawings, like reference numerals will be understood to refer to like parts, components, and structures.

BEST MODE FOR CARRYING OUT THE INVENTION

Figure 1:
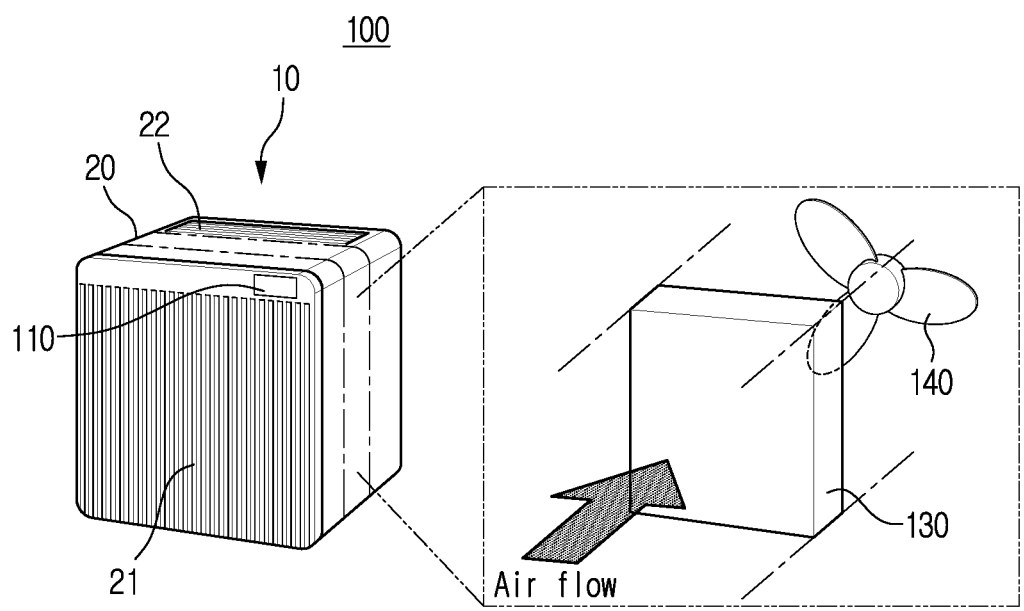
FIG. 1 is a diagram illustrating an air cleaner according to an embodiment of the disclosure.

The disclosure may have various modifications and includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, well-known functions or constructions are not described in detail since they would obscure the disclosure with unnecessary detail.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In the disclosure, the term "has," "may have," "includes" or "may include" indicates existence of a corresponding feature (e.g., a numerical value, a function, an operation, or a constituent element such as a component), but does not exclude existence of an additional feature.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, or (3) at least one A and at least one B together.

In the disclosure, the terms "first, second, etc." may be used to describe various elements regardless of their order and/or importance and to discriminate one element from other elements, but are not limited to the corresponding elements.

If it is described that an element (e.g., first element) is "operatively or communicatively coupled with/to" or is "connected to" another element (e.g., second element), it may be understood that the element may be connected to the other element directly or through still another element (e.g., third element).

When it is mentioned that one element (e.g., first element) is "directly coupled" with or "directly connected to" another element (e.g., second element), it may be understood that there is no element (e.g., third element) present between the element and the other element.

Herein, the expression "configured to" may be used interchangeably with, for example, "suitable for," "having the capacity to," "designed to," "adapted to," "made to," or "capable of" The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processing unit (CPU) or application processor (AP)) that can perform the corresponding actions by executing one or more software programs stored in the memory device.

The term such as "module," "unit," "part," and so on may refer, for example, to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

It is understood that various elements and regions in the figures may be shown out of scale. Accordingly, the scope of the disclosure is not limited by the relative sizes or spacing drawn from the accompanying drawings.

Hereinafter, with reference to the accompanying drawings, an embodiment according to the disclosure will be described in detail so that a person of ordinary skill in the art to which the disclosure pertains can easily implement the disclosure.

FIG. 1 is a diagram illustrating an air cleaner according to an embodiment of the disclosure.

An air cleaner 100 is a device that may remove dust in the air by circulating air.

Referring to FIG. 1, the air cleaner 100 may include a main body 10 forming an external appearance, a case 20 coupled to the outside of the main body 10 and including a suction port 21 for sucking air into the main body and an outlet 22, a display 110, a filter unit (filter) 130 disposed inside the main body 10, and a fan 140 generating an air flow inside the main body 10.

Accordingly, the air cleaner 100 may drive the fan 140 to suck external air of the air cleaner through the suction port 21, filter the sucked air through the filter unit 130, and then discharge the filtered air to the outlet 22.

When the air cleaner 100 performs filtering, dust or the like may be accumulated in the filter unit 130. In this example, the filter unit 130 may need to be replaced in that the filtering performance of the air cleaner 100 is deteriorated as the dust is accumulated in the filter unit 130.

Accordingly, the air cleaner 100 according to an embodiment of the disclosure may provide information related to the state of the filter unit 130 through the display 110 of the air cleaner 100 based on a difference between the dust concentration of air before being filtered by the filter unit 130 and the dust concentration of the air filtered by the filter unit 130.

Accordingly, in the disclosure, it is possible to know the state and replacement time of the filter unit 130 more accurately since the information related to the state of the filter unit 130 is provided to the user based on whether the performance of the filter unit 130 is actually degraded rather than based on the elapsed time after the filter unit 130 is mounted.

Figure 2:
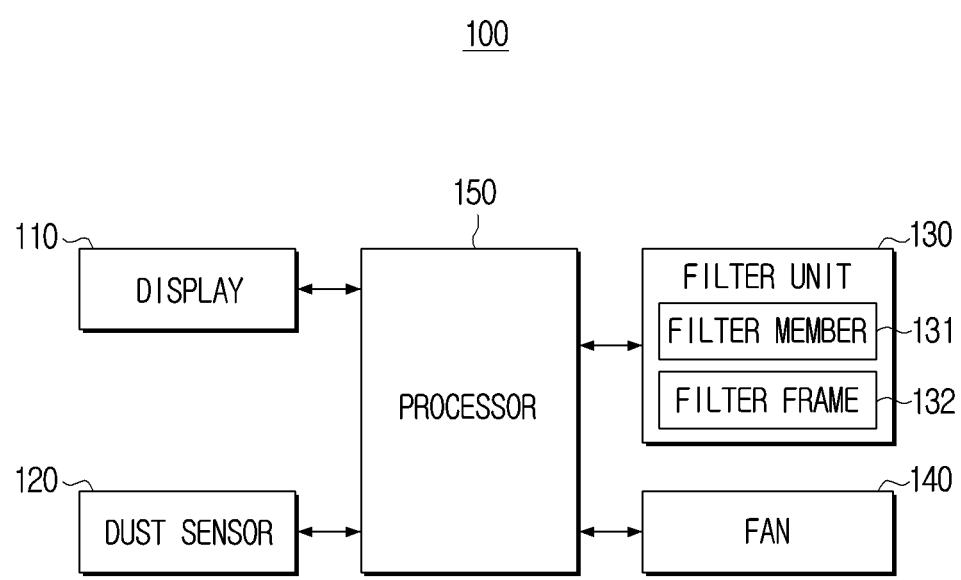
FIG. 2 is a diagram illustrating a configuration of an air cleaner according to an embodiment of the disclosure.

FIG. 2 is a diagram illustrating a configuration of an air cleaner according to an embodiment of the disclosure.

Referring to FIG. 2, the air cleaner 100 may include the display 110, the dust sensor 120, the filter unit 130, the fan 140, and the processor 150.

The display 110 may display various screens related to operation of the air cleaner. For example, the display 110 may display information related to the state of the filter unit 130 of the air cleaner.

The display 110 may be implemented with various displays such as a liquid crystal display (LCD), organic light emitting diodes (OLED), or the like.

The dust sensor 120 may detect the concentration of dust. For example, the dust sensor 120 may detect a concentration of fine dust having a particle size of 10 µm or less, or ultrafine dust having a particle size of 2.5 µm or less.

For example, the dust sensor 120 may include a light emitting element and a light receiving element. In this example, the light emitting element may emit light with respect to the air introduced into the dust sensor 120, and the light receiving element may receive light scattered by dust included in the introduced air among the irradiated lights. Accordingly, the dust sensor 120 may detect the concentration of the dust sensor based on the amount of light received by the light receiving element.

However, this is merely an example, and the dust sensor 120 may detect the dust concentration in the air in various ways.

The filter unit 130 may filter the air sucked into the air cleaner. The filtering may refer to filtering fine dust included in the air or adsorbing harmful gas or odor contained in the air to purify air.

The filter unit 130 may include a filter member 131 for filtering air and a filter frame 132 forming a space where the filter member 131 is mounted.

The filter member 131 may include various types of filters that filter air such as the pre-filter, dust collecting filter, deodorization filter, or the like.

The pre-filter may be disposed adjacent to the suction port 21 of the air cleaner, and may filter dust having a large particle size such as pollen or a pet hair from among dust contained in the air.

The dust collecting filter may filter dust having a small size of particles that are not filtered by the pre-filter in the air passing through the pre-filter. In this example, the dust collecting filter may be implemented as an Ultra-Low Penetration Air (ULPA) filter, a High Efficiency Particulate Air (HEPA) filter, or the like.

The deodorizing filter may adsorb odor particles (for example, harmful gases such as formaldehyde, ammonia, acetic acid, etc.) included in the air using activated carbon. In this example, the deodorization filter may be disposed between the pre-filter and the dust collecting filter or may be integrally formed with the dust collecting filter.

The filter frame 132 is located inside the air cleaner 100 and is configured to attach and detach filter member 131. Accordingly, the filter member 131 may be mounted on the filter frame 132. A dust sensor 120 and a printed circuit board (PCB) substrate (not shown) may be disposed at an upper side of the filter frame 132. In addition, various electronic components for driving an air cleaner 100 such as an integrated circuit, a condenser, and a resistor may be mounted on a PCB substrate (not shown). However, this is merely an example, and the dust sensor 120 and the PCB substrate (not shown) may not necessarily be disposed above the filter frame 132, and may be disposed on any one of the upper side, the left side, the right side, and the lower side.

The fan 140 may inhale external air inside the air cleaner 100 and may exhale the sucked air outside the air cleaner.

The air cleaner 100 may include a motor for driving the fan 140. The fan 140 may be rotated by the motor. As the fan 140 is rotated, flow of air may occur.

For example, the fan 140 may include a centrifugal fan that sucks air in an axial direction and discharges the air in a radial direction. However, this is merely an example, and the fan 140 may be implemented as various types of fans.

Accordingly, air is sucked through the suction port 21 of the air cleaner 100 through the flow of air generated by the fan 140. The sucked air may be filtered by the filter unit 130 and then discharged through the outlet 22 of the air cleaner. The air cleaner 100 may further include a duct (not shown), and in this case, the air passing through the filter unit 130 may flow along a duct (not shown) and be discharged to the outlet 22.

The processor 150 may control the overall operation and function of the air cleaner. The processor 150 may include a central processing unit (CPU), and may execute a software program according to at least one instruction stored in a memory (not shown) to control operations of various hardware included in the processor 150.

The processor 150 may drive the air cleaner. The processor 150 may drive the fan 140 when receiving a user command to drive the air cleaner.

As the fan 140 is driven, air may be sucked through the suction port 21 of the air cleaner, and the sucked air may be filtered by the filter unit 130. The filtered air may be discharged through the outlet 22 of the air cleaner.

In addition, when a user command for setting the driving mode is received, the processor 150 may drive the fan 140 at a speed corresponding to the set driving mode. When a user command for turning off the air cleaner 100 being driven is received, the processor 150 may stop driving of the fan 140.

The processor 150 may control the fan 140 to perform a function corresponding to the user command by the air cleaner.

The processor 150 may control the display 110 to display information related to the state of the filter unit 130 based on the dust concentration sensed through the dust sensor 120.

The processor 150 may identify a difference between the first dust concentration and the second dust concentration when the first dust concentration of the air sucked through the suction port 21 of the air cleaner 100 and the second dust concentration of the air filtered by the filter unit 130 are sensed by the dust sensor 120.

Figure 3A:
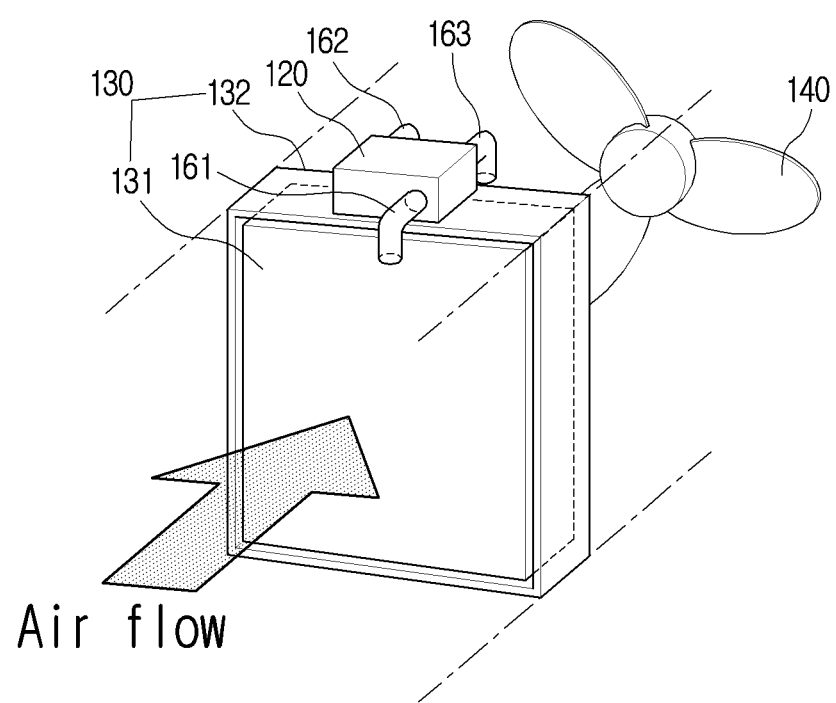
FIGS. 3A and 3B are diagrams illustrating an air cleaner including a first flow path, a second flow path, a first valve, and a second valve according to various embodiments of the disclosure.
Figure 3B:
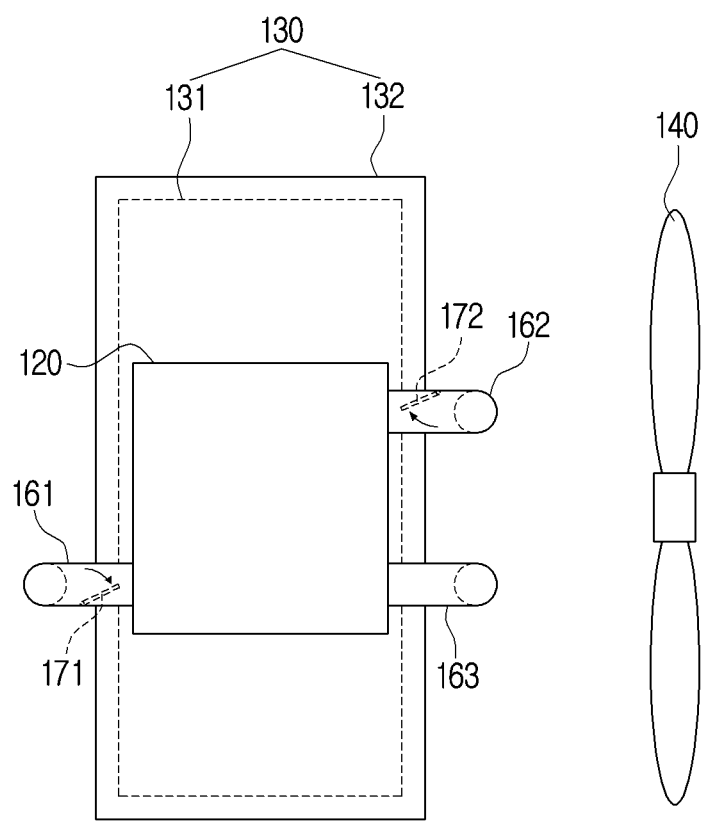

FIGS. 3A and 3B are diagrams illustrating an air cleaner including a first flow path, a second flow path, a first valve, and a second valve according to various embodiments of the disclosure.

Referring to FIGS. 3A and 3B, the air cleaner 100 may include a first flow path 161 provided to allow air sucked through the suction port 21 to flow toward the dust sensor 120 and a second flow path 162 provided to allow the air filtered by the filter unit 130 to flow toward the dust sensor 120.

The dust sensor 120 may be located between the first flow path 161 and the second flow path 162.

The front end of the first flow path 161 through which air flows into the first flow path 161 may be located on the front surface of the filter unit 130 in which the air sucked through the suction port 21 is provided to the filter unit 130, and the front end of the second flow path 162 into which the air is introduced into the second flow path 162 may be located on the rear surface of the filter unit 130 through which the filtered air is discharged from the filter unit 130.

Accordingly, the air sucked through the suction port 21 may be sucked into the first flow path 161 through the front end of the first flow path 161 and provided to the dust sensor 120, and the air filtered by the filter unit 130 may be sucked into the second flow path 162 through the front end of the second flow path 162 and provided to the dust sensor 120.

The air cleaner 100 may include a third flow path 163 provided to flow the air provided to the dust sensor 120 through the first flow path 161 and the second flow path 162 to the outside of the dust sensor 120.

The rear end of the third flow path 163 through which the air of the third flow path 163 is discharged may be located at the rear surface of the filter unit 130 through which the filtered air is discharged from the filter unit 130.

The air provided to the dust sensor 120 through the first flow path 161 or the second flow path 162 may be discharged to the outside of the dust sensor 120 through the rear end of the third flow path 163.

As described above, the air cleaner 100 according to an embodiment of the disclosure may provide the air sucked through the suction port 21 and the air filtered by the filter unit 130 to the dust sensor 120 located on the side of the filter frame 132 through the first flow path 161 and the second flow path 162.

The air cleaner 100 according to an embodiment of the disclosure may provide dust concentration of air before filtered and the dust of filtered air to the dust sensor 120 with a simpler structure. The air cleaner 100 according to an embodiment may save a cost in that a plurality of dust sensors are not required.

The air cleaner 100 may further include a first valve 171 disposed on the first flow path 161 and configured to adjust a flow of the first air, and a second valve 172 disposed on the second flow path 162 and configured to adjust a flow of the second air.

The first valve 171 and the second valve 172 may be configured to open and close the flow path to perform control such as flowing air or fluid or stopping the fluid. For example, the first valve 171 and the second valve 172 may include various valves such as a ball valve, a butterfly valve, a glove valve, a gate valve, and a diaphragm valve.

Accordingly, the air sucked through the suction port 21 may be provided to the dust sensor 120 when the first valve 171 is opened, and may not be provided to the dust sensor 120 when the first valve 171 is turned off. The air filtered by the filter unit 130 may be provided to the dust sensor 120 when the second valve 172 is opened, and may not be provided to the dust sensor 120 when the second valve 172 is turned off.

The processor 150 may open the first valve 171 and turn off the second valve 172 when receiving a user command to drive the air cleaner 100 and may provide the air sucked through the suction port 21 to the dust sensor 120.

The processor 150, when the first dust concentration is detected by the dust sensor 120, may turn off the first valve and open the second valve and provide the air filtered by the filter unit 130 to the dust sensor 120.

The air cleaner 100 may include a motor (not shown) for controlling opening and closing of the first valve 171 and the second valve 172 based on a signal received by the processor 150. Here, the motor (not shown) may rotate in a specific direction based on a signal received from the processor 150. The first valve 171 and the second valve 172 may be opened or turned off by receiving a rotational force of a motor (not shown).

Figure 4A:
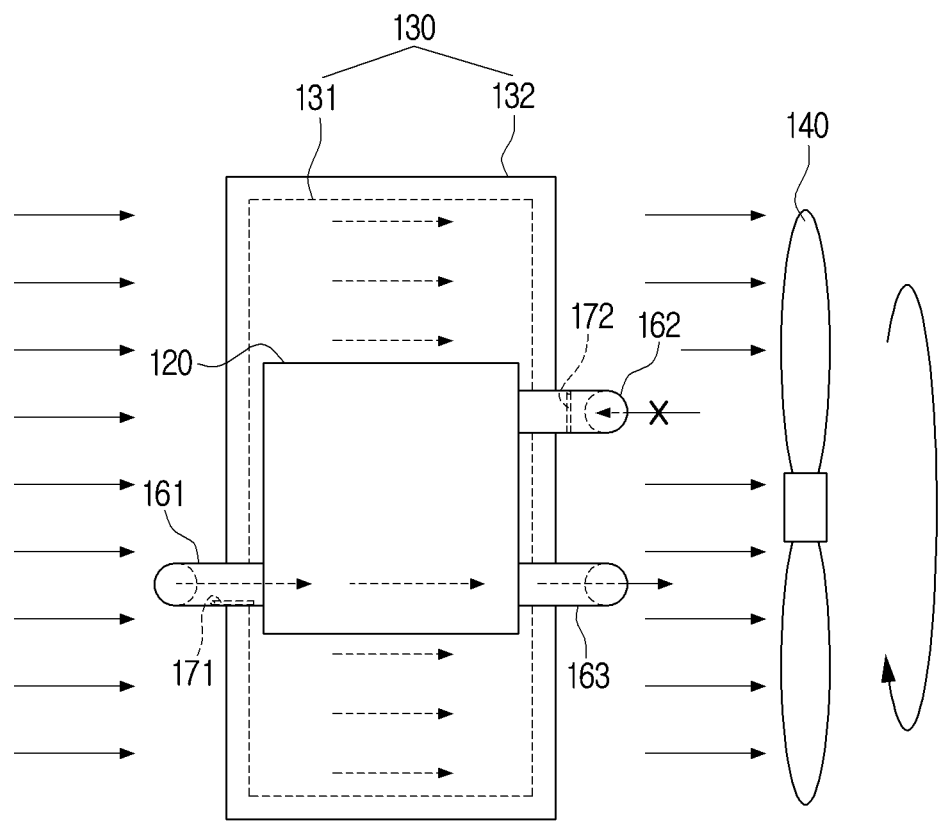
FIGS. 4A and 4B are diagrams illustrating flow of first air and second air according to various embodiments of the disclosure.
Figure 4B:
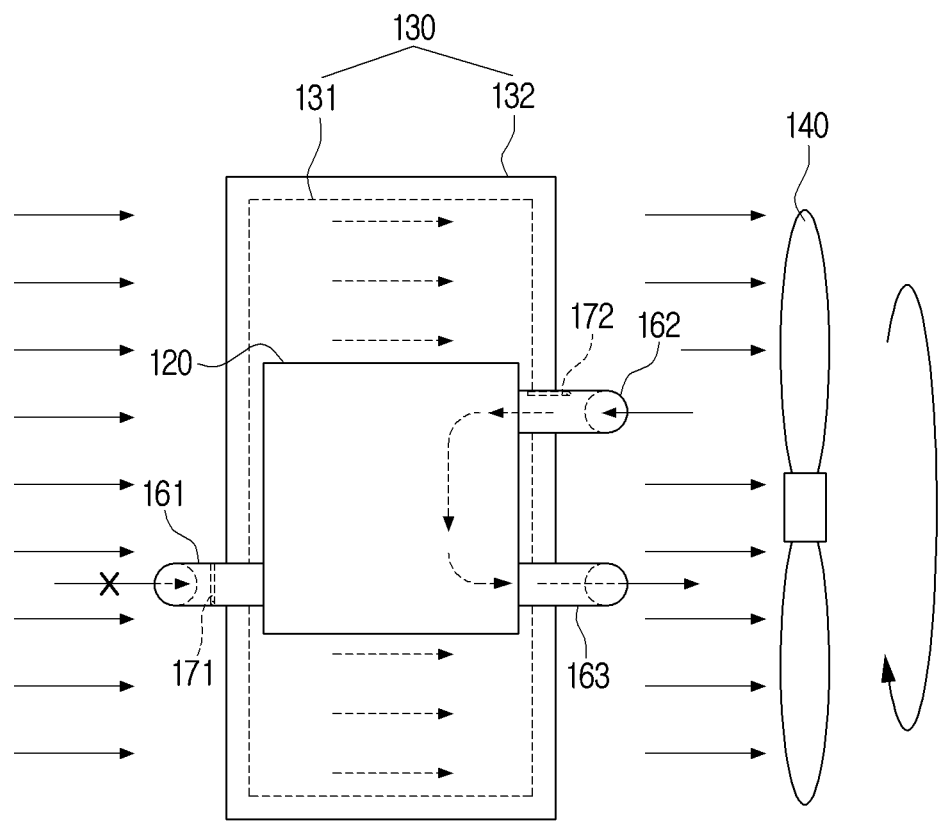

FIGS. 4A and 4B are diagrams illustrating flow of first air and second air according to various embodiments of the disclosure.

Referring to FIG. 4A, the processor 150 may open the first valve 171 while air flow is generated by driving the fan 140 and may off the second valve 172.

In this example, since air may flow in the first flow path 161 and air may not flow in the second flow path 162, the flow of air flowing along the first flow path 161, the inside of the dust sensor 120, and the third flow path 163 may occur. Accordingly, only the air sucked through the suction port 21 may be provided to the dust sensor 120, and the air filtered by the filter unit 130 may not be provided to the dust sensor 120.

Referring to FIG. 4B, the processor 150 may off the first valve 171 while air flow is generated by driving the fan 140 and may open the second valve 172.

In this example, since air may flow in the first flow path 161 and air may not flow in the second flow path 162, the flow of air flowing along the second flow path 162, the inside of the dust sensor 120, and the third flow path 163 may occur. Accordingly, only the air filtered by the filter unit 130 may be provided to the dust sensor 120, and the air sucked through the suction port 21 may not be provided to the dust sensor 120.

The processor 150 may control opening and closing of the first valve 171 and the second valve 172 and may provide the air sucked through the suction port 21 or air filtered by the filter unit 130 to the dust sensor 120.

The processor 150 may identify concentration of dust provided to the dust sensor 120.

In detail, the dust sensor 120 may detect dust concentration of air inside the dust sensor 120 at a predetermined time interval. The processor 150 may identify the average of the plurality of dust concentrations sensed by the dust sensor 120 at a predetermined time interval for a specific time as the dust concentration of the air inside the dust sensor 120.

Accordingly, when the air sucked through the suction port 21 is provided into the dust sensor 120, the processor 150 may identify the first dust concentration. When the air filtered by the filter unit 130 is provided into the dust sensor 120, the processor 150 may identify the second dust concentration.

The processor 150 may control the display 110 to display information related to the state of the filter unit 130 based on the difference between the first dust concentration and the second dust concentration.

When the first dust concentration is identified, the processor 150 may store the identified first dust concentration in the memory. In addition, when the second dust concentration is identified, the processor 150 may store the identified second dust concentration in the memory.

The processor 150 may identify whether the difference between the first dust concentration and the second dust concentration stored in the memory is less than a predetermined value. The difference between the first dust concentration and the second dust concentration may be expressed as (first dust concentration—second dust concentration)/first dust concentration×100. The difference between the first dust concentration and the second dust concentration may mean a ratio in which the concentration of dust filtered by the filter unit 130 decreases.

That the difference between the first dust concentration and the second dust concentration is less than the predetermined value may mean that the dust of the air is not properly removed even when the dust is filtered by the filter unit 130.

This phenomenon may occur because the air cleaner 100 is driven so that dust is accumulated in the filter unit 130 as the filter unit 130 performs filtering, and dust accumulated in the filter unit 130 deteriorates the dust removal performance of the filter unit 130.

The larger the difference between the first dust concentration and the second dust concentration, the higher the dust removal performance of the filter unit 130, and the smaller the difference between the first dust concentration and the second dust concentration, the lower the dust removal performance of the filter unit 130.

The difference between the first dust concentration and the second dust concentration immediately after the air cleaner 100 is driven may have less relevance with the dust removal performance of the filter unit 130.

Specifically, when the air cleaner 100 is not driven, air inside and outside the air cleaner 100 may be stagnant without flowing. Immediately after the air cleaner 100 is driven, the stagnant external and internal air of the air cleaner 100 may be provided to the dust sensor 120.

In this example, no convection phenomenon occurs, and thus dust may be densely distributed in a specific space in the air. Accordingly, the concentration of the first dust concentration identified from the congested air and the dust concentration of the second air may be affected by the dust concentrated and distributed among the stagnant air.

According to an embodiment of the disclosure, when a predetermined time elapses after the air cleaner 100 is driven, the processor 150 may identify whether a difference between the first dust concentration and the second dust concentration is less than a predetermined value.

The processor 150 may open the first valve 171 and turn off the second valve 172 when a predetermined time elapses after a user command for driving the air cleaner 100 is received, and may provide the air sucked through the suction port 21 to the dust sensor 120.

When the first dust concentration is detected by the dust sensor 120, the processor 150 may turn off the first valve and open the second valve to provide the air filtered by the filter unit 130 to the dust sensor 120.

As described above, the air cleaner 100 according to an embodiment of the disclosure may identify a difference between the first dust concentration and the second dust concentration having a high correlation with the dust removal performance of the filter unit 130 in that the air cleaner 100 operates the air cleaner 100 and identifies the difference between the first dust concentration and the second dust concentration from the not stagnant air.

When the driving speed of the fan 140 is changed while the dust sensor 120 senses the first dust concentration and the second dust concentration, the difference between the first dust concentration and the second dust concentration may be less related to the dust removal performance of the filter unit 130.

In detail, the dust concentration of air detected by the dust sensor 120 may vary depending on the driving speed of the fan 140. Specifically, as the driving speed of the fan 140 increases, the flow of the air generated by the fan 140 becomes faster, and the dust concentration of the air detected by the dust sensor 120 may be reduced by rapidly diffusing the dust included in the air. In contrast, as the driving speed of the fan 140 gets slow, the flow of the air generated by the fan 140 becomes slow, and the dust concentration of the air sensed by the dust sensor 120 may be increased by slowly diffusing the dust included in the air.

If the driving speed of the fan 140 is changed when the first dust concentration is detected and the driving speed of the fan 140 is detected, the correlation between the difference between the first dust concentration and the second dust concentration and the dust removal performance of the filter unit 130 may be deteriorated in that the flow rate of the air provided to the dust sensor 120 through the first flow path 161 and the flow rate of the air provided to the dust sensor 120 through the second flow path 162 may vary.

Accordingly, according to an embodiment of the disclosure, while the first dust concentration and the second dust concentration are sensed, the processor 150 may constantly maintain a driving speed of the fan 140 to constantly maintain a flow rate of air provided to the dust sensor 120 through the first flow path 161 and the air provided to the dust sensor 120 through the second flow path 162.

As described above, since the air cleaner 100 according to an embodiment of the disclosure identifies the difference between the first dust concentration and the second dust concentration while the driving speed of the fan 140 is maintained constant, the difference between the first dust concentration and the second dust concentration having high correlation with the dust removal performance of the filter unit 130 may be identified.

The processor 150 may control the display 110 to display a user interface (UI) for guiding replacement of the filter unit 130 when it is identified that the first dust concentration and the second dust concentration are less than a preset value.

Figure 5:
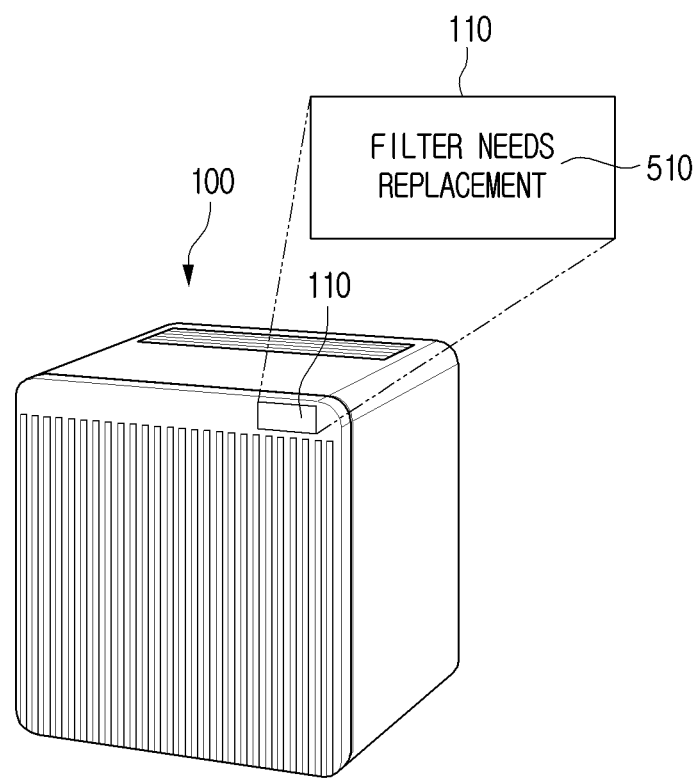
FIG. 5 is a diagram illustrating displaying information related to a state of a filter by an air cleaner according to an embodiment of the disclosure.

FIG. 5 is a diagram illustrating displaying information related to a state of a filter by an air cleaner according to an embodiment of the disclosure.

Referring to FIG. 5, when it is identified that the first dust concentration and the second dust concentration are less than a predetermined value, the processor 150 may control the display 110 to display a UI 510 including a text such as "the replacement of the filter is required."

The preset value may be set to be diverse according to environment in which the air cleaner 100 is used, a user, or the like.

For example, when the air cleaner 100 is used in a place where the dust concentration in the air is maintained to be low, such as a hospital or a research facility, the preset value may be set to 70%. Accordingly, the user may frequently replace the filter unit 130 to maintain the dust removal performance of the air cleaner 100 to be high.

In contrast, when an air cleaner 100 is used in a place where dust is frequently generated, such as a factory or an underground facility, a predetermined value may be set to 30%. Accordingly, the user may use the filter unit 130 for a long time to save the cost generated by the replacement of the filter unit 130.

As such, the air cleaner 100 according to an embodiment of the disclosure is informed to the user that replacement of the filter unit 130 is needed based on a difference between the dust concentration of the air before filtering and the dust concentration of the filtered air, so that the user may replace the filter unit 130 at a more appropriate time.

When the difference between the first dust concentration and the second dust concentration is greater than or equal to a predetermined value, the processor 150 may control the display 110 to display information on the remaining lifespan of the filter unit 130 based on the identified difference.

The information about the remaining lifespan of the filter unit 130 corresponding to each of a plurality of sections to which the difference between the first dust concentration and the second dust concentration belongs may be stored in the memory.

The processor 150 may identify information about the remaining lifespan of the filter unit 130 corresponding to the difference between the first dust concentration and the second dust concentration, and control the display 110 to display information on the remaining lifespan of the identified filter unit 130.

Figure 6B:
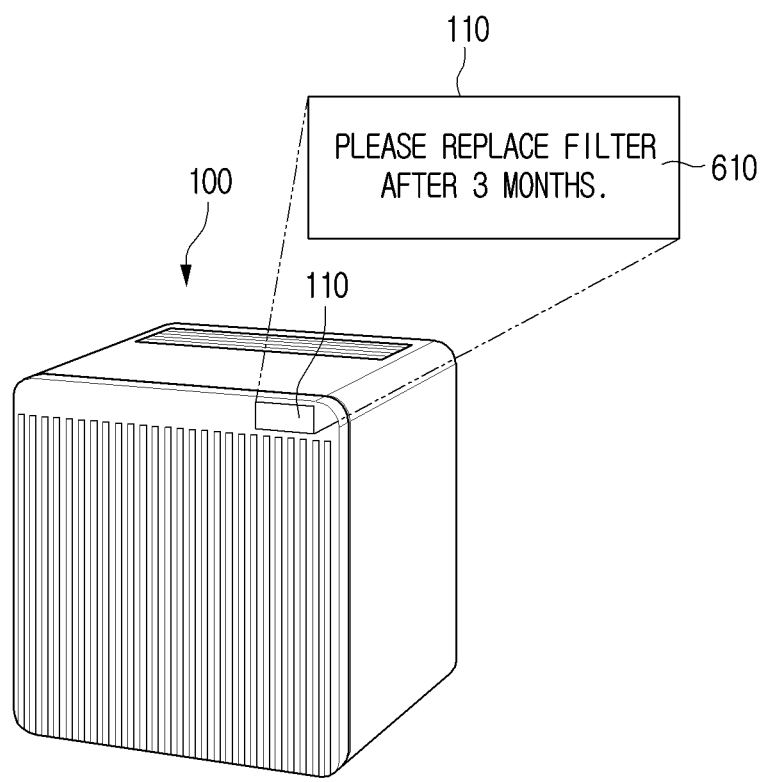

FIGS. 6A and 6B are diagrams illustrating displaying information related to a state of a filter by an air cleaner 100 according to various embodiments of the disclosure.

Referring to FIG. 6A, the remaining lifespan of the filter unit 130 stored in the memory is 1 year when the difference between the first dust concentration and the second dust concentration is 100% or less and greater than 90%, 6 months when the difference between the first dust concentration and the second dust concentration is not more than 90% and greater than 80%, 3 months when the difference is not more than 80% and greater than 70%, 1 month when the difference is not more than 70% and greater than 60%, and 10 days when the difference is not more than 60% and greater than 50%.

If the difference between the first dust concentration and the second dust concentration is 77%, the processor 150 may identify that the remaining lifespan of the filter unit 130 corresponding to the difference between the first dust concentration and the second dust concentration is three months.

Referring to FIG. 6B, the processor 150 may control the display 110 to display information that the remaining lifespan of the filter unit 130 is three months, like "please replace the filter after 3 months" 610.

In the above-described example, the predetermined value may be 50%. Accordingly, when it is identified that the difference between the first dust concentration and the second dust concentration is less than 50%, the processor 150 may control the display 110 to display a UI for guiding the replacement of the filter unit 130.

As described above, the air cleaner 100 according to an embodiment of the disclosure may notify the user of the remaining lifespan of the filter unit 130 based on the difference between the dust concentration of the air before filtering and the dust concentration of the filtered air, and thus the user may more accurately grasp the remaining lifespan of the filter unit 130.

The processor 150 may control the display 110 to display information on the identified second dust concentration. In this example, the information on the second dust concentration may be displayed as µg/m3 which is a measurement unit, or may be displayed in a dust concentration state corresponding to the identified dust concentration, for example, 0 to 30 µg/m3 or less which is good, 31 to 80 µg/m3 as so-so, and greater than or equal to 81 µg/m3 as bad.

The processor 150 may display the information about the second dust concentration, UI for guiding the replacement of the filter unit 130, or information about remaining lifespan of the filter unit 130.

Figure 7:
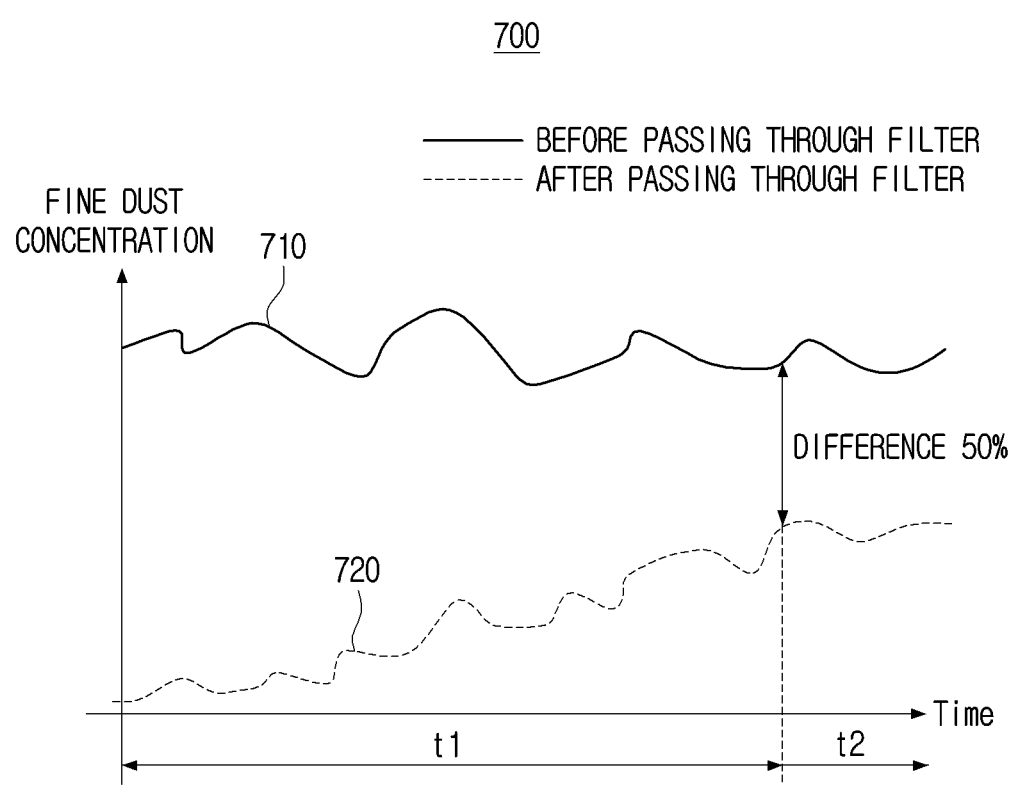
FIG. 7 is a graph illustrating first dust concentration and second dust concentration identified by an air cleaner according to an embodiment of the disclosure.

FIG. 7 is a graph illustrating first dust concentration and second dust concentration identified by an air cleaner according to an embodiment of the disclosure.

Referring to FIG. 7 depicting graph 700, the processor 150 may identify the first dust concentration 710 and the second dust concentration 720 as shown in FIG. 7. In this case, the first dust concentration 710 and the second dust concentration 720 may be dust concentrations identified after a predetermined time elapses after the air cleaner 100 is driven. In addition, the first dust concentration 710 and the second dust concentration 720 may be dust concentrations identified while the driving speed of the fan 140 is maintained constant.

The difference between the first dust concentration 710 and the second dust concentration 720 may be reduced as time passes from the time when the air cleaner 100 is first driven. This may be because, as the air cleaner 100 is driven, dust accumulates in the filter unit 130 and the dust removal performance of the filter unit 130 decreases.

The processor 150 may control the display 110 to display information on the remaining lifespan of the filter unit 130 based on the difference in the first dust concentration 710 and the second dust concentration 720 in the interval t1 in which the difference between the first dust concentration 710 and the second dust concentration 720 is greater than a preset value of 50%.

The processor 150 may control the display 110 to display a UI for guiding replacement of the filter unit 130 in an interval t2 where the difference between the first dust concentration 710 and the second dust concentration 720 is less than or equal to a preset value of 50%.

The processor 150 may control the display 110 to display information about the remaining lifespan of the filter unit 130 or information about the second dust concentration 720 together with a UI for guiding the replacement of the filter unit 130.

Figure 8:
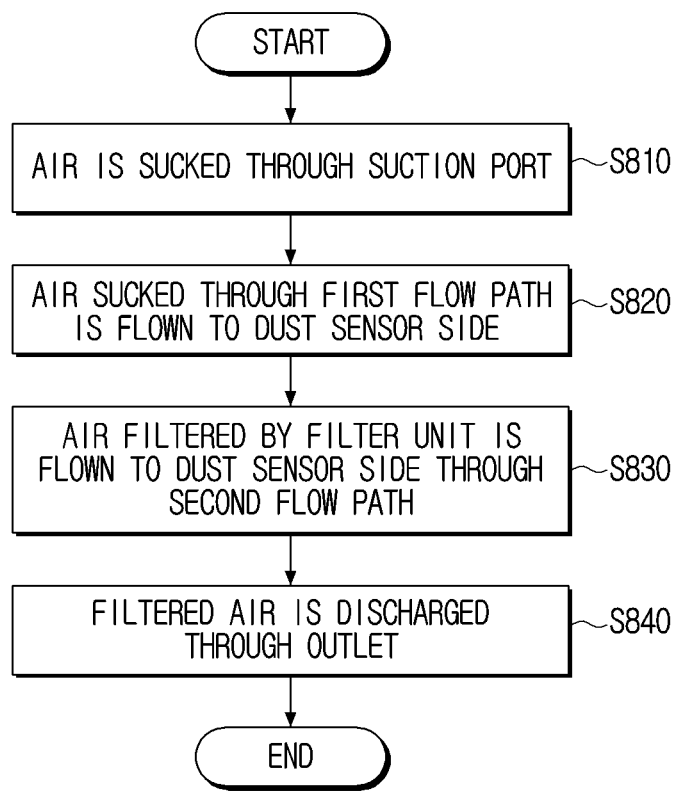
FIG. 8 is a flow chart illustrating a control method of an air cleaner according to an embodiment of the disclosure.

FIG. 8 is a flow chart illustrating a control method of an air cleaner according to an embodiment of the disclosure.

Referring to FIG. 8, first, air is sucked through a suction port in operation S810.

The air sucked through the first flow path is flown to the dust sensor side in operation S820.

The air filtered by the filter unit is flown to the dust sensor side through the second flow path in operation S830.

The filtered air is discharged through the outlet in operation S840.

The dust sensor may sense first dust concentration of air provided through the first flow path and sense second dust concentration of air provided through the second flow path.

The dust sensor may be located between the first flow path and the second flow path.

The front end of the first flow path in which the air sucked through the suction port is flown to the first flow path may be located at a front surface of the filter unit to which the air sucked through the suction port is provided, and a front end of the second flow path in which air filtered by the filter unit is flown to the second flow path may be located on a rear surface of the filter unit from which the filtered air is discharged.

The control method may further include flowing the air provided to the dust sensor through the third flow path to the outside of the dust sensor.

The rear end of the third flow path from which the air is discharged may be located on a rear surface of the filter unit from which the filtered air is discharged from the filter unit.

The filter unit may include a filter member for filtering air sucked through the suction port; and a filter frame for forming a space in which the filter member is mounted.

The dust sensor may be disposed on an upper side of the filter frame.

The operation S810 may include the sucking air through the suction port by driving a fan and the operation S820 may include discharging the filtered air through the outlet by driving a fan, and the control method may further include, based on the first dust concentration and the second dust concentration being sensed through the dust sensor, identifying difference between the first dust concentration and the second dust concentration, and displaying information related to a state of the filter based on the identified difference.

A first valve located on the first flow path for opening and closing the first flow path; and a second valve located on the second flow path for opening and closing the second flow path may be further included.

The operation S820 may include, based on receiving a user command to drive the air cleaner, providing air sucked through the suction port to the dust sensor by turning on the first valve and turning off the second valve, and based on the first dust concentration being sensed by the dust sensor, providing air filtered by the filter unit to the dust sensor by turning off the first valve and turning on the second valve.

In operation S820, based on a preset time being elapsed after the user command is received, first valve may be turned on and the second valve may be turned off.

The control method may include maintaining a driving speed of the fan constantly while the first dust concentration and the second dust concentration are being sensed.

The operation S840 may include, based on the identified difference being identified to be less than a preset value, displaying a user interface for guiding replacement of the filter.

The operation S840 may include, based on the identified difference being greater than or equal to a preset value, displaying information about remaining lifespan of the filter based on the identified difference.

The operation S840 may include displaying information about the second dust concentration.

A specific method of identifying the first dust concentration and the second dust concentration by the air cleaner and displaying information related to a state of a filter based on the identified dust concentration has been described above.

Figure 9:
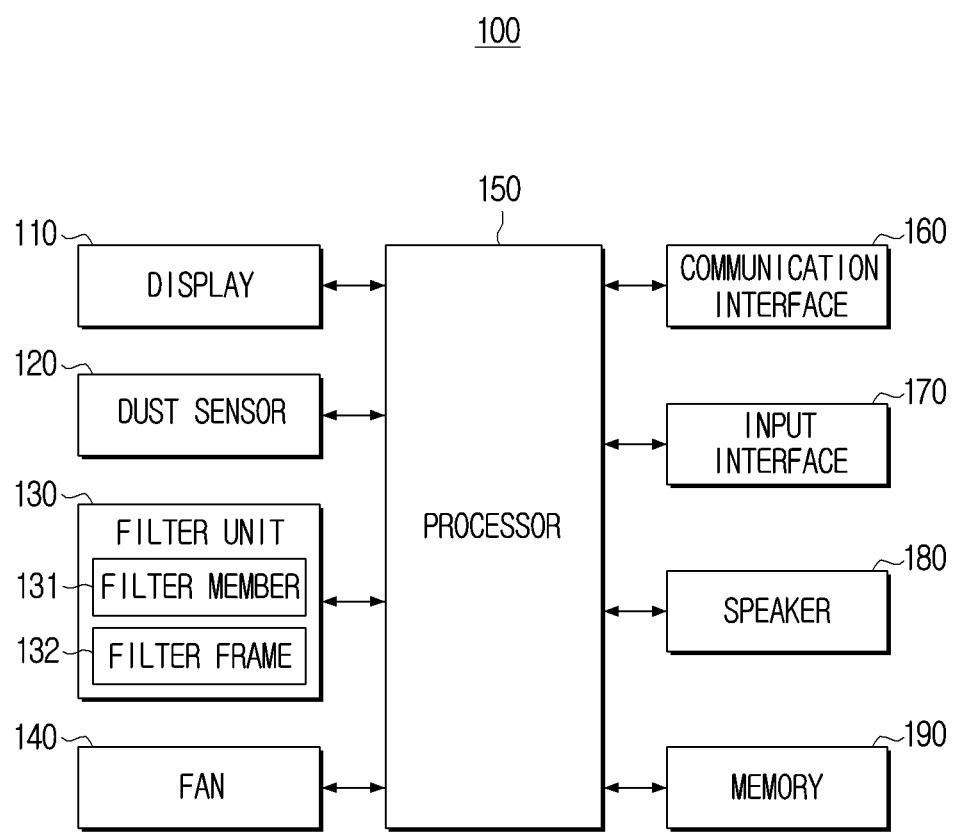
FIG. 9 is a block diagram illustrating a detailed configuration of an air cleaner according to an embodiment of the disclosure.

FIG. 9 is a block diagram illustrating a detailed configuration of an air cleaner according to an embodiment of the disclosure.

Referring to FIG. 9, the air cleaner 100 may include the display 110, the dust sensor 120, the filter unit 130, the fan 140, the processor 150, a communication interface 160, an input interface 170, a speaker 180, and a memory 190.

However, such a configuration is exemplary, and in implementing the disclosure, in addition to this configuration, a new configuration may be added or some configurations may be omitted. The display 110, the dust sensor 120, the filter unit 130, the fan 140, and the processor 150 have been described with reference to FIGS. 1, 2, 3A, 3B, 4A, 4B, 5, 6A, 6B, 7, and 8. In illustrating FIG. 9, parts overlapping with the previously described parts will be omitted or abbreviated.

The communication interface 160 is configured to communicate with an external device. The processor 150 may transmit various data to an external device through the communication interface 160 and receive various data from the external device. For example, the processor 150 may receive a user command for controlling the operation of the air cleaner 100 through the communication interface 160.

The communication interface 160 may perform communication with an external device through wireless communication such as Bluetooth (BT), Bluetooth low energy (BLE), WI-FI, or the like.

The input interface 170 may receive a user command. The input interface 170 may include a plurality of buttons. The input interface 170 may transfer a user command input through a plurality of buttons to the processor 150.

In the embodiments described above, the processor 150 may control the operation of the air cleaner 100 based on the received user command when the user command is received through the communication interface 160 and the input interface 170.

For example, when a user command for driving the air cleaner 100 is received, the processor 150 may drive the fan 140. When a user command for setting the driving mode is received, the processor 150 may drive the fan 140 at a speed corresponding to the driving mode. In addition, when a user command for turning off the air cleaner 100 being driven is received, the processor 150 may stop driving of the fan 140.

The processor 150 may control an operation of the air cleaner 100 according to various user commands.

The speaker 180 may output audio. The processor 150 may output various notification sounds related to the operation of the air cleaner 100 or a voice guide message through the speaker 180.

For example, the processor 150 may control the speaker 180 to output a voice message indicating information related to the state of the filter unit 130 or a voice message indicating information related to the second dust concentration, based on a difference between the first dust concentration detected by the dust sensor 120 and the second dust concentration.

The memory 190 may store various data related to the operation and function of the air cleaner. For example, the identified first dust concentration and the identified second dust concentration may be stored in the memory 190. The memory 190 may store information on the remaining lifespan of the filter unit 130 corresponding to a plurality of sections to which a difference between the first dust concentration and the first dust concentration and the second dust concentration belongs. The processor 150 may control the display 110 to display information related to the state of the filter based on the information stored in the memory 190.

At least one instruction related to the air cleaner 100 may be stored in the memory 190. Various software programs or applications for operating the air cleaner 100 may be stored in the memory 190 according to various embodiments of the disclosure. The memory 190 may include a volatile memory such as a frame buffer, a semiconductor memory such as a flash memory, or a magnetic storage medium such as a hard disk.

A non-transitory computer readable medium in which a program for sequentially performing a method of controlling an air cleaner according to the disclosure is stored may be provided.

A machine-readable storage medium may be provided in the form of a non-transitory storage medium. Herein, the term "non-transitory" only denotes that a storage medium does not include a signal (e.g., electromagnetic wave) but is tangible, and does not distinguish the case in which a data is semi-permanently stored in a storage medium from the case in which a data is temporarily stored in a storage medium. For example, "non-transitory storage medium" may refer to a buffer temporarily storing data.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g., PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

In addition, each of the components (e.g., modules or programs) according to various embodiments may include a single entity or a plurality of entities, and some sub-components of the sub-components described above may be omitted, or other sub-components may be further included in the various embodiments. Alternatively or additionally, some components (e.g., modules or programs) may be integrated into one entity to perform the same or similar functions performed by the respective components prior to the integration.

The operations performed by the module, the program, or other component, in accordance with various embodiments may be performed in a sequential, parallel, iterative, or heuristic manner, or at least some operations may be executed in a different order or omitted, or other operations may be added.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

The various example embodiments as described above may be implemented with software including instructions stored in the machine-readable storage media readable by a machine (e.g., a computer). A machine is a device which may call instructions from the storage medium and operate according to the called instructions, and may include an electronic device of the embodiments.

When the instructions are executed by a processor, the processor may perform a function corresponding to the instructions directly or by using other components under the control of the processor. The instructions may include a code generated by a compiler or a code executable by an interpreter.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An air cleaner comprising:
   a main body;
   a case coupled to an outer side of the main body and comprising a suction port for sucking air into the main body;
   a filter unit disposed inside the main body;

a dust sensor for sensing dust concentration;

a first flow path provided so that air sucked through the suction port is flown to the dust sensor;

a first valve located on the first flow path for opening and closing the first flow path;

a second flow path provided so that air filtered through the filter unit is flown to the dust sensor; and a second valve located on the second flow path for opening and closing the second flow path, a third flow path provided so that air provided to the dust sensor, through the first flow path and the second flow path, is flown to an outside of the dust sensor, wherein the dust sensor is further configured to sense first dust concentration of air flowing along the first flow path, the dust sensor, and the third flow path in a state where the first valve is opened and the second valve is closed and sense second dust concentration of air flowing along the second flow path, the dust sensor, and the third flow path in a state where the first valve is closed and the second valve is opened, wherein a front end of the first flow path in which the air sucked through the suction port is flown to the first flow path is located at a front surface of the filter unit to which the air sucked through the suction port is provided, wherein a front end of the second flow path in which air filtered by the filter unit is flown to the second flow path is located on a rear surface of the filter unit from which the filtered air is discharged, and wherein a rear end of the third flow path from which the air is discharged is located on a rear surface of the filter unit from which the filtered air is discharged from the filter unit.

2. The air cleaner of claim 1, wherein the filter unit comprises:

a filter member for filtering air sucked through the suction port; and a filter frame for forming a space in which the filter member is mounted.

3. The air cleaner of claim 2, wherein the dust sensor is disposed on an upper side of the filter frame.

4. The air cleaner of claim 1, further comprising:

a display;

a fan for sucking the air through the suction port and discharging the filtered air through an outlet of the air cleaner; and a processor configured to:

based on the first dust concentration and the second dust concentration being sensed through the dust sensor, identify a difference between the first dust concentration and the second dust concentration, and control the display to display information related to a state of the filter unit based on the identified difference.

5. The air cleaner of claim 4, wherein the processor is further configured to:

based on receiving a user command to drive the air cleaner, provide air sucked through the suction port to the dust sensor by turning on the first valve and turning off the second valve, and based on the first dust concentration being sensed by the dust sensor, provide air filtered by the filter unit to the dust sensor by turning off the first valve and turning on the second valve.

6. The air cleaner of claim 5, wherein the processor is further configured to, based on a preset time being elapsed after the user command is received, turn on the first valve and turn off the second valve.

7. The air cleaner of claim 4, wherein the processor is further configured to maintain a driving speed of the fan constantly while the first dust concentration and the second dust concentration are being sensed.

8. The air cleaner of claim 4, wherein the processor is further configured to, based on the identified difference being identified to be less than a preset value, control the display to display a user interface for guiding replacement of the filter unit.

9. The air cleaner of claim 4, wherein the processor is further configured to, based on the identified difference being greater than or equal to a preset value, control the display to display information about remaining lifespan of the filter unit based on the identified difference.

10. The air cleaner of claim 4, wherein the processor is further configured to control the display to display information about the second dust concentration.

11. The air cleaner of claim 4, wherein the dust sensor is configured to detect a concentration of fine dust having a particle size of 10 μm or less.

12. The air cleaner of claim 4, wherein the dust sensor is configured to detect a concentration of ultrafine dust having a particle size of 2.5 μm or less.

13. The air cleaner of claim 4, wherein the air cleaner further comprises a motor for opening and closing at least one of the first valve or the second valve.

* * * * *